United States Patent [19]

Fujieda et al.

[11] Patent Number: 4,804,318

[45] Date of Patent: Feb. 14, 1989

[54] VERTICALLY OPENING AND CLOSING TYPE TIRE VULCANIZER

[75] Inventors: Yasuhiko Fujieda; Katsumi Ichikawa, both of Akashi, Japan

[73] Assignee: Kabushiki Kaisha Kobe Seiko Sho, Kobe, Japan

[21] Appl. No.: 2,989

[22] Filed: Jan. 13, 1987

[30] Foreign Application Priority Data

Jan. 16, 1986 [JP] Japan .................... 61-7360

[51] Int. Cl.$^4$ .............................................. B29C 35/00
[52] U.S. Cl. ..................................... 425/34.1; 425/47
[58] Field of Search ................... 425/34 R, 34 A, 47, 425/34.1, 34.2

[56] References Cited

U.S. PATENT DOCUMENTS

| 4,245,971 | 1/1981 | Macmillan | 425/47 |
| 4,332,536 | 6/1982 | Singh et al. | 425/34 R |
| 4,448,575 | 5/1984 | Hanyu et al. | 425/47 |
| 4,453,902 | 6/1984 | Imbert | 425/47 |
| 4,484,874 | 11/1984 | Okawachi | 425/47 |
| 4,484,875 | 11/1984 | Irie et al. | 425/47 |
| 4,563,139 | 1/1986 | Yokoyama et al. | 425/47 |

FOREIGN PATENT DOCUMENTS

| 0071842 | 4/1984 | Japan | 425/47 |
| 59-138432 | 8/1984 | Japan. | |

Primary Examiner—Willard Hoag
Attorney, Agent, or Firm—Oblon, Fisher, Spivak, McClelland & Maier

[57] ABSTRACT

A vertically opening and closing type tire vulcanizer in which a plurality of vulcanizing molds installed on a vulcanizer frame are individually driven. A mold clamping mechanism and a mold height adjusting mechanism which are simplified in terms of construction are provided. A high rigidity heat insulating plate for transmitting a clamping force is interposed between a top slide and an upper mold.

5 Claims, 3 Drawing Sheets

VERTICALLY OPENING AND CLOSING TYPE TIRE VULCANIZER

BACKGROUND OF THE INVENTION

1. Field of the Invention

The present invention relates to a tire vulcanizer known as a vulcanizing and molding press for green tires, in which a plurality of vulcanizing molds installed on a vulcanizer frame may be individually driven and operated, wherein the construction and operation of a mold clamping mechanism and a mold height adjusting mechanism in each of the molds are simplified and facilitated.

2. Description of the Prior Art

A tire vulcanizer of the type in which a plurality of vulcanizing split molds are juxtaposed has been known, said tire vulcanizer comprising, in a common vulcanizer frame, a lower mold provided on the base frame side and an upper mold provided on the side frame side, said upper mold being vertically movably and open- and closable toward the lower mold. One example of such vulcanizer is disclosed in Japanese Unexamined Publication No. Sho 59-71842 filed by the present applicant. In this conventional vulcanizer, as shown in FIGS. 1 to 5 thereof, lower molds 14 secured onto a vulcanizer base 1 and upper molds 15 vertically movably and open- and closable toward the lower molds 14 are provided along the guides 3, 3 which are side frames stood upright on the base 1, the upper molds 15 being individually moved up and down by a plurality of fluid pressure cylinders 4 disposed correspondingly in the periphery thereof. Piston rods 17 equadistantly arranged on the vulcanizing base 1 encircling the outer peripheries of the lower molds 14 and including lock portions 18 are provided, as a clamping mechanism for both upper and lower molds, and a plurality of clamping fluid pressure cylinders 2 which makes the locking position of the lock portions 18 variable according to the height of the molds are provided. A clamping movable lock shaft 32, which is engaged with and disengaged from the lock portion 18 of a piston rod 17 of the cylinder 2, is provided in the outer periphery of the upper mold 15 and corresponding to the cylinder 2. With this, the upper mold 15 is made to be closed with respect to the lower mold 14 to cause the lock portion 18 of the piston rod 17 of the fluid pressure cylinder 2 to move into a locking leg 9 of the upper mold 15 so as to engage a lock tail 31 of a lock shaft 32 of the leg 9, and rotation of the lock shaft 32 through 90 degrees locks the lock tail 31 and the lock portion 18, whereby the piston rod 17 of the cylinder 2 is moved downward to clamp the upper and lower molds 14 and 15. If different molds are used and the mold height is then varied, the piston rod 17 of the clamping fluid pressure cylinder 2 is threadedly turned for upward and downward movement to change the position of engagement with the lock tail 31 of the lock shaft 32. An apparatus for clamping upper and lower molds generally known is of the system in which a connection end of upper and lower domes provided to encircle the outer peripheries of upper and lower molds is clamped by a breech-lock mechanism (for example, such as Japanese Patent Unexamined Publication No. Sho 59-138432 which corresponds to U.S. Pat. No. 4,563,130).

Generally, a tire vulcanizer frequently used is of a twin type in which two vulcanizing molds in the form of open- and closable upper and lower molds are juxtaposed on the vulcanizer frame. Usually, in the juxtaposed open- and closable upper molds in the vulcanizing split molds, top slides which form the upper construction of the upper molds are connected to each other by a connecting beam so that they may be opened and closed together. Paired synchronous driving operation is advantageous in view of productivity and operating efficiency but, in the event a mold different in thickness (or height) is used in either mold, such is disadvantageous in view of operation because accurate adjustment of the mold height is required. In the case of the twin type vulcanizer disclosed in Japanese Patent Application Laid-Open No. 22118/1982, each vulcanizer mold is constructed such that the upper mold is individually opened and closed by an exclusive-use elevating cylinder, and therefore, even if molds different in thickness (or height) are used, adjustment of the mold height can be easily carried out and vulcanizing of tires different in size may be facilitated. In addition, only one vulcanizing mold can be operated while the other is at rest. This system is suitable for a small production of a variety of kinds but has the following problems in clamping of the molds and the mechanism for adjustment of mold height. In the aforesaid patent, four clamping fluid pressure cylinders 2 are provided on the undersurface of the vulcanizer base encircling the outer periphery of the lower molds 14, and the piston rods 17 of the cylinders 2 are projected externally of the lower dome 14a. Similarly, four lock shafts 32 are likewise disposed encircling the outer dome 15a of the upper die 15 so that closure of the upper mold 15 with respect to the lower mold 14 is made completely, the lock portion 18 of the piston rod 17 is moved into the lock tail 31 of the lock shaft 32, and the lock shaft 32 is turned to lock the lock portion 18 and the lock tail 31, the piston rod 17 being pulled down to effect clamping. In adjustment of the mold height, the piston rod 17 in the cylinder 2 is moved up and down to vertically change the lock position. That is, the provision of four clamping lock shafts 32 around the upper mold 15 and of four piston rods 17 around the lower mold 14, in a limited space of the vulcanizer frame, is disadvantageous because the construction becomes complicated. Furthermore, there is required a moving mechanism for simultaneously driving four lock shafts 32 and a moving mechanism for simultaneously moving four piston rods 14, resulting in a further complication of the entire construction as required. In the tire vulcanizer, as is known, a thermal pressure medium such as steam is used for vulcanization and molding and therefore such is placed under high heat and high pressure environments. In clamping molds, the upper and lower molds are clamped against the thermal pressure medium supplied thereto, and therefore, apart from the upper mold and lower mold, the upper dome 15a and lower dome 14a surrounding the upper and lower molds, respectively, and the base frame and top link (top frame and top beam) are liable to receive flexure and deformation due to the clamping reaction. In addition, there is a tendency that the distribution of clamping force in the upper and lower mold is strong on both sides of the mold and is weaker than the former in the central side. The provision of the clamping mechanism and various moving mechanisms around the molds and of various moving mechanisms as described above therefore still pose problems in that various parts of the assembly are adversely affected.

SUMMARY OF THE INVENTION

The present invention overcomes the aforesaid problems by the provision of the type in which an upper mold is vertically moved and opened and closed with respect to a lower mold, and a plurality of such vulcanizing split molds are juxtaposed on a common vulcanizer frame, said vulcanizing molds being individually driven. According to the invention, a clamping mechanism and a mold-height adjusting mechanism are improved, particularly in that the mechanisms as required are materially simplified and operation is facilitated. More specifically, the present invention provides a vertically opening and closing type tire vulcanizer having a plurality of vulcanizing split molds juxtaposed, said molds comprising, in a common vulcanizer frame, a lower mold installed on the base frame side and an upper mold installed on the side frame side so as to be vertically moved and open- and closable with respect to said lower mold, said upper molds in said split molds being disposed to be individually moved up and down through their respective exclusive-use elevating cylinders, a clamping mechanism for the upper and lower molds in each of said split molds being supported on a clamping force generating cylinder with a bottom surface of each lower mold installed on the base frame, wherein an upper end of a clamping rod stood upright in the center of an elevating top slide of each upper mold and provided with an adjustable clamping rod extension member which is brought into engagement with a movable clamping plate arranged in a position corresponding to each clamping rod of the top frame in the vulcanizer frame for individual clamping.

According to the present invention, a high rigidity heat insulating plate for transmission of a clamping force is interposed between the top slide and the upper mold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
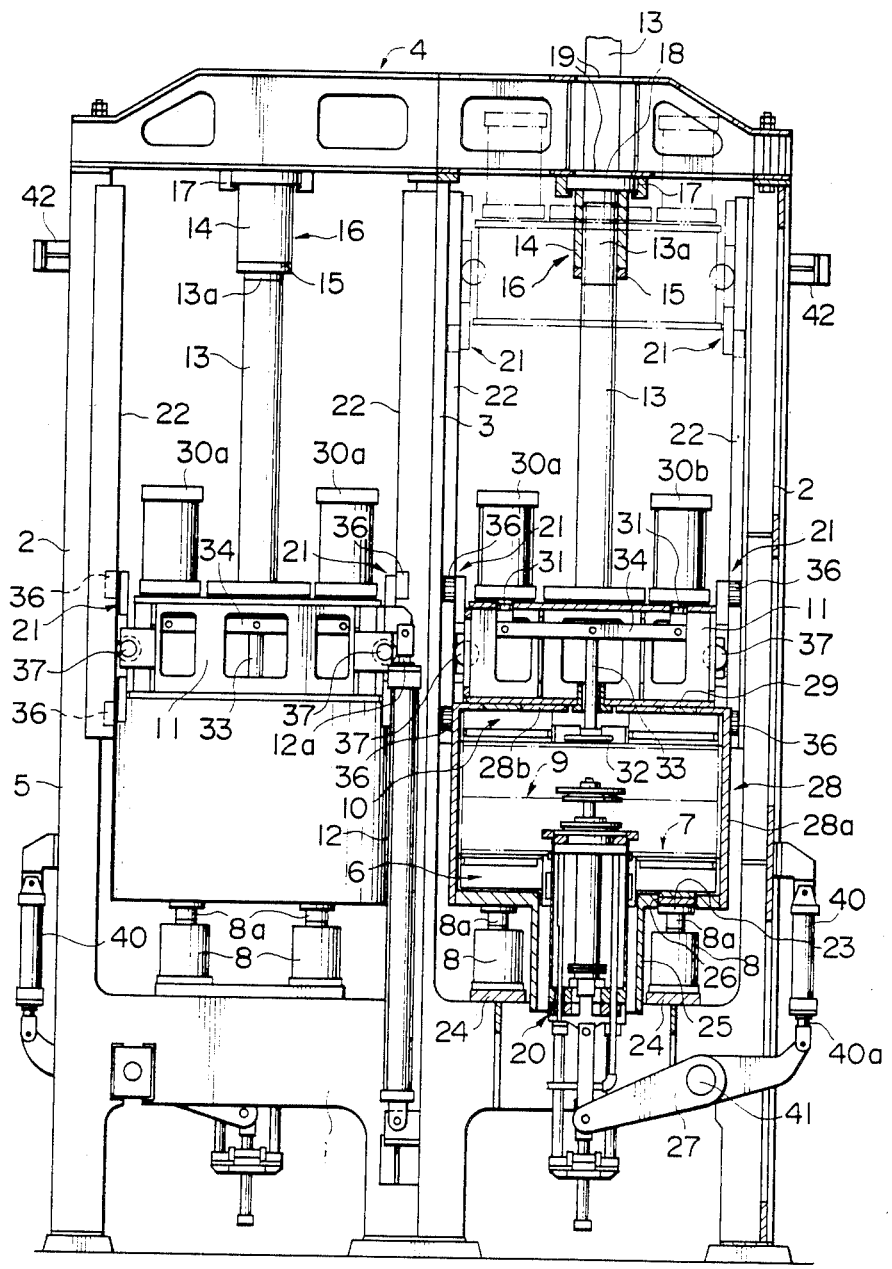
FIG. 1 is a longitudinal sectional elevational view showing a principal portion of a vulcanizer according to the present invention.

Prior to proceeding with the description of the embodiment, operation of the vulcanizer according to the present invention will be described.

According to the technical means of the present invention, in a vulcanizer frame 5 comprising a base frame 1, side frames 2, 2 erected on the frame 1, a center frame 3 and a top frame 4 for connecting upper ends of the frames 2, 3 and 2, four clamping force generating cylinders 8 are mounted on the base frame 1 corresponding to four equally divided places in the bottom surface of a lower mold mounting body 6, thus corresponding to four equally divided places of a lower mold 7 secured to said mounting body 6, and piston rods 8a of the cylinders 8 are respectively connected to the bottom surface of the lower mold mounting body 6. A top slide 11 integrally provided on the upper mold mounting body 10 on which an upper mold 9 is mounted corresponding to the fixed lower mold 7 is vertically movably mounted between the side frame 2 and the center frame 3. Piston rods 12a, 12a of corresponding elevating cylinders 12, 12 mounted on the base frame 1 side are connected on opposite sides of the top slide 11. An upwardly extending clamping rod 13 is stood upright in a central position concentric with a press center of the top slide 11, the clamping rod 13 having at its upper end a threaded shaft 13a, an adjusting nut 14 engaged therewith and an adjustable clamping rod extension member 16 by a locknut 15. A clamping plate 18 which is movable forward and backward through a guide 17 is provided on the lower surface of the top frame 4 positioned corresponding to the upper end of the clamping rod 13 so that the upper end of the clamping rod 13 is restrained by the clamping plate 18 and the rod 13 and top frame 4 are mechanically integrated by the plate 18. Two vulcanizing molds constructed as described above are juxtaposed on the vulcanizing frame 5 to provide the following operation. In the state shown in FIG. 1, both upper and lower molds 9 and 7 are completely closed together, and the clamping plate 18 is engaged with the upper end of the clamping rod 13 erected in the center of the top slide 11 in the upper mold 9. Thus, the piston rods 8a of the four clamping force generating cylinders 8 mounted on the base frame 1 are moved upward under the necessary clamping pressure to urge the lower mold 7 against the upper mold through the lower mold mounting body 6 to effect clamping through the fixation by the upper mold mounting body 10 in the upper mold 9, the top slide 11, the clamping rod 13, the clamping plate 18 and the top frame 4. This clamping is individually carried out by the two juxtaposed vulcanizing molds, and the whole clamping force is directly carried by the vulcanizer frame 5. Then vulcanizing and molding of a green tire (not shown) sealed into the upper and lower molds 9 and 7 in the each vulcanizing mold under a supply of thermal pressure medium such as steam proceeds in a known manner. When the vulcanizing and molding have been completed, the clamping force generating cylinders 8 are released under pressure to move downwardly move the piston rods 8a and release contact between the upper and lower molds 9 and 7. The clamping plate 18 is withdrawn to release the clamping rod 13, after which the piston rods 12a, 12a of the elevating cylinders 12, 12 are moved upward whereby in the vulcanizing molds on the right hand as viewed in FIG. 1, the top slide 11 is moved upward from the solid line position to the broken line position to open and withdraw the upper mold 9, and removing of the vulcanized tire remaining on the lower mold 7 is carried out by a member, such as a tire unloader, in a known manner. At that time, the clamping rod 13 in the top slide 11 projects upwardly of the frame 4 through a passing hole 19 made in the top frame 4 when the upper mold is opened. After the vulcanized tire has been removed, setting of a new green tire into the lower mold through a tire loader or the like and inserting and attaching of a bladder to the inner surface of the green tire by a center mechanism 20 mounted in the center position of the lower mold mounting body 6 are carried out in a known manner. Thereafter, the upper mold 9 in an upward open and withdrawn position is closed into the lower mold 7 through the downward movement of the top slide 11 resulting from the downward movement of the piston rods 12a, 12a of the elevating cylinders 12, 12. When the green tire is sealed within both the upper and lower molds 9 and 7 which are then closed together, the clamping plate 18 in the withdrawn position is again moved in along the guide 17 into engagement with the upper end of the clamping rod 13, thus repeating the clamping operation as described above. In vertical movement of the upper mold 9 by the elevating cylinders 12, 12, the slide guides 21, 21 provided on both left and right sides of the top slide 11 are made along the straight-ahead guides 22, 22 provided on the inner surfaces of the side frame 2 and the center frame 3, respectively, to thereby obtain accurate straight-ahead movement without tilting and without impairing the parallelism of the upper mold 9 to the lower mold 7. In changing the upper and lower molds 9 and 7 with those having a different thickness in either vulcanizing mold, it is necessary to adjust the mold height. This adjustment may be carried out by varying the length of the clamping rod 13. More specifically, in the expansion member adjustable clamping rod extension 16 of the clamping rod 13, the locknut 15 is loosened, and the adjusting nut 14 is normally and reversely turned according to the threaded shaft 13a to vary the level of the upper end of the nut 14 and the resultant adjusted position is locked by the locknut 15 to thereby provide proper engagement with the clamping plate 18. That is, according to the tire vulcanizer of the present invention, wherein a plurality of vulcanizing molds comprising upper and lower molds 9 and 7, said upper mold 9 being vertically moved to be opened and closed with respect to the lower mold 7, opening and closing of the upper mold with respect to the lower mold 7 in each vulcanizing split mold is individually driven and clamping of the upper mold 9 and lower mold is also individually driven. This clamping can be done merely by engagement of the clamping plate 18 with the clamping rod 13 and by upward movement of the piston rod 8a by the clamping force generating cylinder 8. In addition, the adjustment required due to the difference in mold height can be accomplished merely by the expanding operation of the extension member 16 in the clamping rod 13. Thus, the construction and operation as required may be materially simplified and facilitated.

Preferred embodiments according to the present invention will now be described with reference to FIGS. 1 through 3.

The vulcanizer frame 5 is formed with the side frames 2, 2 on both left and right sides of the base frame 1 secured to a floor surface. Since the twin type is employed, the center frame 3 is likewise formed in the central position of the base frame 1. The top frame 4 is fixed over upper ends of these three frames 2, 2 and 3 to thereby form an integral rigid frame. Since two vulcanizing molds comprising the lower mold 7 and upper mold 9 are of the same construction, only one of them will be described. Either lower mold mounting body 6 or upper mold mounting body 10 comprises an integral assembly of a platen, a heat insulating plate, a mold support and the like as will be known. The piston rods 8a of four clamping force generating cylinders (hydraulic pressure cylinders) 8 installed on one side of the base frame 1 are connected through heat insulating material 23 at four positions equally distanced from the press center in the bottom surface of the lower mold mounting body 6 positioned concentric with the press center. The cylinders 8 are installed in pairs on mounting beams 24, 24 in a lateral direction in the base frame 1 in order to obtain a uniform distribution of clamping force during clamping of molds. In order to thermally insulate the lower mold mounting body from the cylinders 8, there is interposed therebetween a heat insulating tubular board 25 made of a heat insulating material as shown in FIG. 1. A loosely receiving hole 26 for the piston rod 8a in the cylinder 8 is bored in the wall surface (the side in contact with the lower mold assembly) in the tubular board 25. A center mechanism 20 is vertically movably mounted in the center position of the lower mold assembly 6 through a lift lever 27. The center mechanism 20 is positioned close to the inner surface of a green tire to control a bladder which molds and pressurizes the inner surface of the tire through a supply of thermal pressure medium (steam) and is provided with a supply means of said thermal pressure medium. The center mechanism 20 can be either a post-in well type wherein a bladder is housed in a well or standing post type wherein a bladder is located outside the center mechanism, which provide the same effect. In the illustrated embodiment, the post-in well type is employed. The upper and lower molds 9 and 7 can be in the form of known metal molds without modification, and therefore they are not illustrated.

On the top surface which forms the mold mounting surface of the upper mold mounting body 10 is mounted a heat retaining shield tube 28 made of a heat insulating material in a superposed fashion in place of a conventional dome construction. A tubular portion 28a of the shield tube 28 is open at its lower end and has a height so as to cover all of the upper mold mounting body 10, the upper mold 9, the lower mold 7 and the lower mold mounting body 6 and so that the lower end thereof is superposed to the upper end peripheral edge of the heat insulating tubular board 25 whereby the essential parts of vulcanizing and molding may be shielded from the outside to well maintain thermal efficiency. In a top portion 28b of the shield tube 28, a high rigidity heat insulating plate 29 is mounted as shown in FIG. 1 in a position corresponding to the position pressed by the piston rod 8a of the clamping force generating cylinder 8. This positively transmits a supporting reaction from the vulcanizer frame 5 to the upper mold mounting body 10 through the top frame 4, the clamping rods 13, 13 and the top slide 11. The bottom surface of the top slide 11 is fixedly mounted in a superposed fashion onto the top 28b of the heat retaining shield tube 28 through the fixation at the position of the high rigidity heat insulating plate 29. This top slide 11 is generally in the form of a hollow box-shaped frame, and the clamping rod 13 is integrally fixedly mounted so as to upwardly projecting at the center position concentric with the press center of the upper surface of the slide 11. Therefore, in the prior art, the retaining fluid pressure cylinder 30 disposed at the center position of the top slide serving as a retaining member for the upper mold 9 is divided into two left and right retaining cylinders 30a and 30b as shown in FIG. 1, which are located to the left and right on the upper surface of the top slide 11 with the clamping rod 13 sandwiched therebetween, and piston rods 31, 31 of the cylinders 30a and 30b are connected to a shaft 33 of the upper mold mounting plate 32 by means of a connecting rod 34 to retain the upper mold 9. In the extension member 16 provided on the upper end of the clamping rod 13, in the illustrated embodiment, the rod 13 is formed at the upper end with a threaded shaft 13a, a locknut 15 and an adjusting nut 14 are threadedly engaged with the shaft 13a in said order, the locknut 15 is loosened and the adjusting nut 14 is turned to thereby vary the amount of projection of the nut 14. In the thus adjusted position, the locknut 15 is tightened to maintain that position. The vertically moving construction of the top slide 11 will be described. In the illustrated embodiment, as shown in FIGS. 1, 2 and 3, connecting arms 35, 35 are projected from two corners at the diagonal positions of the upper surface of the top slide 11 along both the left and right sides of the slide 11, and the piston rods 12a, 12a of the elevating cylinders 12, 12 installed on the front side or rear side of the base frame 1 on the side of the side frame 2 and center frame 3 corresponding to said arms 35, 35 are connected to the projecting ends of the arms 35, 35, respectively so that they may be moved up and down. Guides 22, 22 having at least two perpendicular surfaces are stood vertically upright and parallel to each other before and after the inside of the side frame 2 and center frame 3 on the sides of the connecting arms 35, 35, said two perpendicular surfaces being directed at both sides parallel to the connecting arms 35, 35 of the top slide 11. Slide guides 21, 21 comprising guide rollers 36 and 37 are provided on opposite ends on both sides of the top slide 11, said guide rollers being differently directed so that they may reversely come into contact with the two perpendicular surfaces of said guides 22, 22. The top slide 11 may be vertically moved in a horizontal attitude without inclination by the guiding of the guide 22 and slide guide 21. Accordingly, the parallelism of the upper mold 9 to the lower mold 7 may be constantly maintained through the movement of the upper mold mounting body 10 integral therewith.

Figure 2:
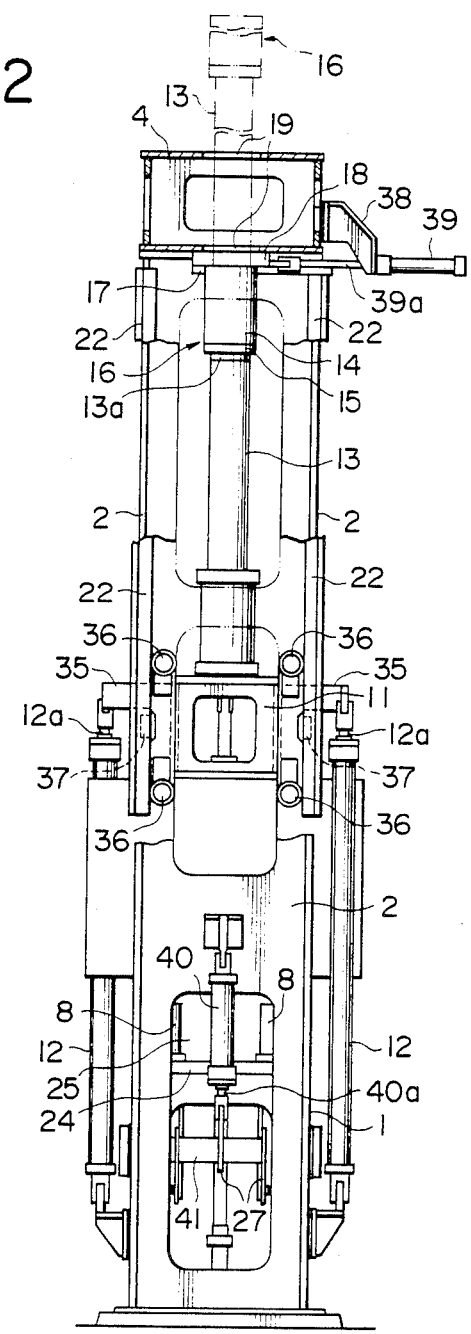
FIG. 2 is a partly sectioned side view of the same.
Figure 3:
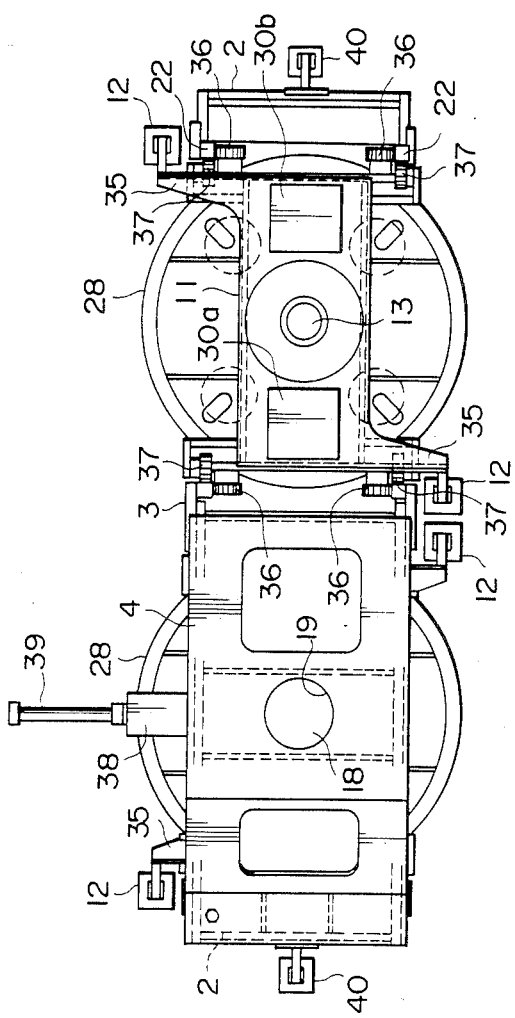
FIG. 3 is a plan view in cross section showing a half of the vulcanizer.

The clamping plate 18 for engaging the upper end of the clamping rod 13 relative to the top frame 4 during clamping is movably supported for forward and backward movement on the guide 17 provided on the lower surface of the top frame 4, as shown in FIGS. 1 and 2, and is connected to the piston rod 39a of the moving cylinder 39 provided through a bracket 38 at the rear of the top frame 4 so as to provide adequate size to completely close the passing hole 19 formed over top and bottom of the top frame 4 in the opposed position of the clamping rod 13. In the illustrated embodiment, reference numeral 40 designates a cylinder for driving an elevating lever 27 for the center mechanism 20, and a piston rod 40a thereof is connected to one end of the lift lever 27 which is pivotable about a pivot 41 to drive the lift lever 27. Reference numeral 42 designates a safety device which is moved upward by the elevating cylinders 12, 12 to prevent the top slide 11 in the open and withdrawn position from falling in case of unexpected trouble. Though not shown, this safety device has a construction in which an engaging member moved forward and backward by the cylinders or the like is brought into engagement with and disengagement from the slide 11.

The extension member 16 in the clamping rod 13 corresponding to the clamping plate 18 can be replaced by, for example, a plate-like construction such as a spacer, or a motor or the like may be used for automatic adjustment. The guide construction formed by the top slide 11 and the side frame 2, and the guide 3 on the frame 3 side and the slide guide 21 is not limited to the illustrated embodiment but can be changed in design so that a vertical guide recess is provided on the side of the frames 2, 3, and a guide raised portion provided on the top slide 11 side is slidably and closed fitted into said recess. Furthermore, in place of an arrangement wherein the high rigidity heat insulating plate 29 is partly provided on the top 28b of the heat retaining shield tube 28 at the position corresponding to the clamping force generating cylinder 8, the active top portion 28b or the active shield tube 28 may be formed of a high rigidity heat insulating material. It is also noted that the shield tube is divided into two upper and lower sections, and the lower side may be suspended by means of a spring or the like.

According to the above-described embodiment, in a manner similar to that described previously about the operation, opening and closing operation of the upper mold 9 to the lower mold 7 and clamping by way of upwardly pressing the piston rods 8a of the clamping force generating cylinders 8 after both the molds 9 and 7 have been completely closed together are carried out by engagement of the clamping plate 18 with the upper end of the clamping rod 13, and the required adjustment of molds height is also carried out by the expanding operation of the extension member 16 of the clamping rod 13.

According to the present invention, there is provided an arrangement of the type in which a plurality of vulcanizing molds are juxtaposed on a tire vulcanizer frame 5, the molds being individually driven whereby production of a variety of and a small volume of tires may be conveniently accomplished such as that green tires having the same size may be vulcanized and molded in both molds and that green tires having different sizes may be individually vulcanized and molded. Particularly in the present invention, in the individual driving of the molds, the construction of the clamping mechanism and mold-height adjusting mechanism may be simplified and the operation thereof may be facilitated. More specifically, the present invention provides a construction in which a plurality of clamping force fluid pressure cylinders 8 capable of pressing equally divided positions of the bottom surface of the lower mold 7 are disposed on the base frame 1, a single clamping rod 13 is stood upright in the central position concentric with the press center of the top slide 11 which moves up and down while supporting the upper mold 9, and the rod 13 is fixed with the top frame 4 through the clamping plate 18. With this arrangement, in clamping, the piston rod 8a of the cylinder 8 may be moved upward through a short stroke to thereby obtain a clamping force, which is materially simpler in construction than the prior art in which four pressing cylinders and four clamping shafts are disposed encircling the outer peripheries of upper and lower molds and the piston rods of the pressing cylinders are forced down to effect clamping. In the prior art, a moving mechanism for synchronously rotating a plurality of clamping shafts is required; in adjustment of mold height, the heights of the piston rods of the pressing cylinders are made to be different and therefore a moving mechanism for synchronously rotating the piston rods is required, which entails the required construction to be extremely complicated to increase an installation space in the outer peripheries of both upper and lower molds, thus requiring a larger-sized vulcanizer. On the other hand, in the present invention, four clamping force generating cylinders 8, a single clamping rod 13 and a single clamping plate 18 will suffice, and as a moving mechanism for these members, only a mechanism for moving the clamping plate 18 forward and backward is required, to thus greatly simplify the construction. Moreover, in adjustment of mold height, the adjustment is carried out by expanding and contracting the extension member 16 provided on the clamping rod 18, thus eliminating a particular moving mechanism. Furthermore, because of hot pressing and molding, the present invention is advantageous for a vulcanizer which is liable to impart thermal strain or flexture to various members.

In consideration of the clamping effect, in the prior art in which pressing cylinders are arranged on the outer peripheral side away from the lower mold and a clamping rod is likewise arranged in the outer periphery, the clamping force tends to be applied strongly to the outside of the upper mold whilst being weakly applied to the central portion. On the other hand, in the present invention, the four clamping force generating cylinders 8 are such that the equally divided positions of the bottom surface of the lower mold 7 are supported through the piston rods 8a directly on the base framed 1, and as the piston rods 8a are forced upward, the clamping rod 13 stood upright in the press center position on the upper mold 9 side is made integral with the top frame 4 in the vulcanizer frame 5 through the clamping plate 18 whereby the uneven distribution of the clamping force which is weak in the central portion and strong in the peripheries may be eliminated to thus easily obtain even distribution of clamping force over the entire mold surface as well as the support of the vulcanizer frame 5 by the whole structure, thus obtaining a positive and strong clamping effect. Moreover, since no construction parts are present along the peripheries of the vulcanizing molds in the vulcanizer, the required space may be decreased and a compact design may be provided.

Also, the parallelism of the upper mold 9 to the lower mold 7 is well maintained. As is known, in the midst of closing the upper mold 9, a bladder is positioned close to the center mechanism 20 and preshaping of a green tire set on the lower mold 7 by a supply of thermal pressure medium starts. During this shaping, the green tire is moved down together with the descending upper mold 9. The parallelism between the upper and lower mold is important until they are completely closed together but during the shaping the lower mold 7 is in a stationary position and the upper mold 7 is moved straight ahead in a horizontal direction through the top slide 11, and therefore the parallelism therebetween is extremely well maintained. In addition, the lack of a need for the upper and lower dome construction, the breech lock mechanism and the like as in prior art contributes to simplification of the construction of the present invention. The arrangement of the present invention is excellent with respect to extreme simplification and readiness of the mechanism and operation for clamping and adjustment of mold height in addition to the advantages in the individual driving, clamping and adjustment of mold height.

In addition, the high rigidity heat insulating plate 29 is interposed between the top slide 11 and the upper mold mounting body 10 in consideration of thermal strain and thermal deformation, whereby the transmission of forces in vertical direction may be positively and effectively accomplished.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vertically opening and closing type tire vulcanizer having a plurality of vulcanizing molds opposing each other, said vulcanizer comprising:
   a common vulcanizer frame;
   a horizontally extending top frame connected to a top portion of said common vulcanizer frame;
   a lower mold installed on the base frame side and an upper mold installed on the side frame side of said frame so as to be vertically movable and open-and closable with respect to said lower mold wherein upper molds for each die pair of said split molds are disposed to be individually movable up and down through respective exclusive-use elevating cylinders mounted on said base frame;
   a clamping mechanism for the upper and lower molds in each of split molds, said clamping mechanism being supported on a clamping force generating cylinder with a bottom surface of each lower mold being installed on said base frame;
   a clamping rod having an upper end stood upright in a center portion of an elevating top slide of each upper mold;
   a movable clamping plate arranged on said top frame and at an upper portion of each clamping rod for restraining an upper end portion of said clamping rod; and
   an adjustable clamping rod extension member for engaging said movable clamping plate.

2. The vertically opening and closing type tire vulcanizer as claimed in claim 1 wherein a high rigidity heat insulating plate for transmission of a clamping force is interposed between the top slide and the upper mold.

3. The vertically opening and closing type tire vulcanizer as claimed in claim 1 wherein said extension member comprises a plate member.

4. The vertically opening and closing type tire vulcanizer as claimed in claim 1 further comprises a safety device provided so as for supporting the top slide.

5. The vertically opening and closing type tire vulcanize: as claimed in claim 1 further comprising a bladder and a center mechanism located in a center portion of the lower mold assembly for supplying a thermal pressure medium and for controlling said bladder.

* * * * *